United States Patent
Shirasu et al.

[11] 4,023,890
[45] May 17, 1977

[54] ELECTRO-TRANSMISSIVE DISPLAY DEVICE

[75] Inventors: Shinichi Shirasu; Yasushi Nomura, both of Tokorozawa, Japan

[73] Assignee: Citizen Watch Co., Ltd., Tokyo, Japan

[22] Filed: July 31, 1975

[21] Appl. No.: 600,574

[30] Foreign Application Priority Data

Aug. 7, 1974 Japan .............................. 49-90636

[52] U.S. Cl. ........................ 350/160 LC; 340/336
[51] Int. Cl.² ......................................... G02F 1/16
[58] Field of Search ............. 350/160 LC; 340/336

[56] References Cited
UNITED STATES PATENTS

| | | | |
|---|---|---|---|
| 3,600,060 | 8/1971 | Churchill et al. | 350/160 LC |
| 3,837,729 | 9/1974 | Harsch | 350/160 LC |
| 3,892,471 | 7/1975 | Biermann et al. | 350/160 LC |

*Primary Examiner*—John K. Corbin
*Assistant Examiner*—Rolf Hille
*Attorney, Agent, or Firm*—Sherman & Shalloway

[57] ABSTRACT

A digital display device for forming one or more electro-transmissive display patterns, which comprises a pair of oppositely disposed electrodes to which a signal is supplied for energization. Each of the electrodes includes a number of electro-conductive sections which are disposed with a lower distribution density at the central portion and with a higher distribution density at the contour portion. This mode of distribution of the sections gives an equivalent visual contrast to the situations in which all the sections are disposed with a uniform distribution while at the same time reducing the power consumption rate.

4 Claims, 16 Drawing Figures

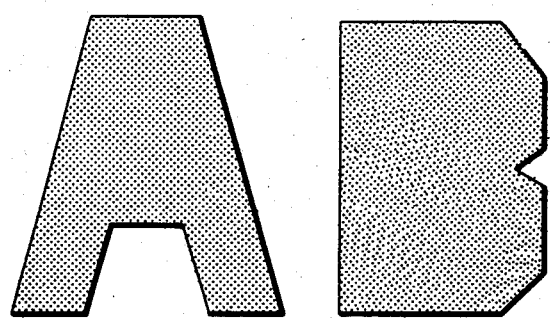
FIG.3
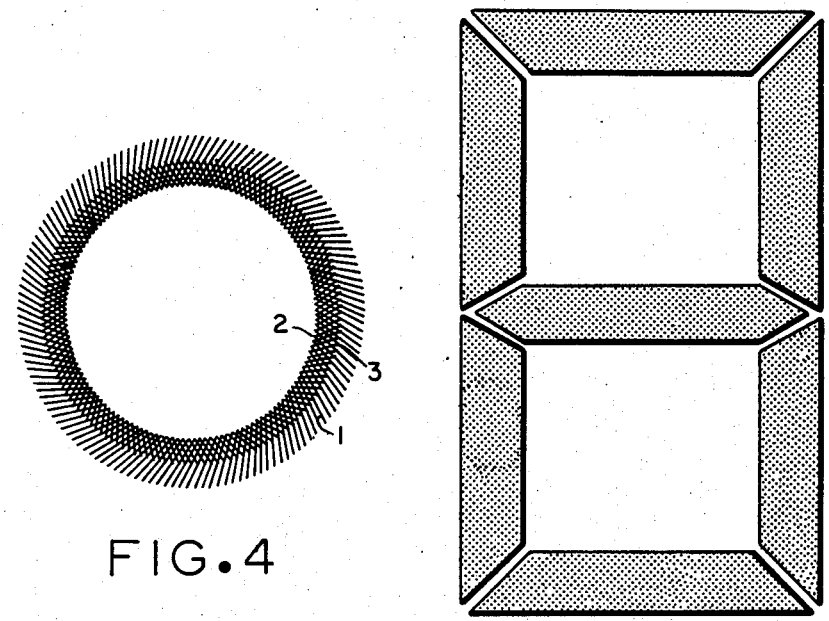
FIG.4
FIG.6
PRIOR ART
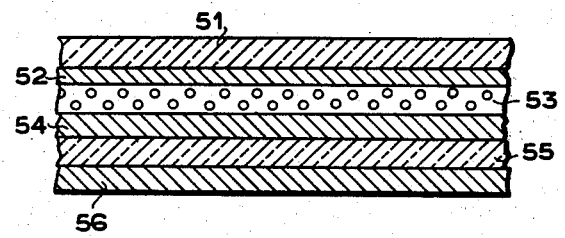
FIG.5
PRIOR ART

ELECTRO-TRANSMISSIVE DISPLAY DEVICE

BACKGROUND OF THE INVENTION

This invention relates to a digital display device having one or more display patterns, which includes a pair of oppositely disposed electrodes and an electro-transmissive substance in the form of solid, liquid or liquid crystal. The device modifies a mode of the transmission of light when excited by an electric signal supplied to the electrodes. A typical example of the electro-transmissive display is a liquid crystal display, but this invention can also be applied to an electrochromatic display or the like.

With the pattern cognition in the human beings, the following is well known:

1. The reaction of the nerve network of the retina has, as shown in FIG. 1, maximum and minimum values at the adjacent portions to the boundary line between bright and dark portions, although there is no change in brightness at each portion to objective excitation. This is because the contour is accentuated by the excitation and mutual inhibition of the nerve system.

2. The same contrast phenomenon occurs in all systems in which the field contentionally existing the positive (irrigating) and negative (inhibitory) action exists.

In xerography, for example, the thick and solid region in black or grey color can not be copied very well. In xerography a selenium plate which has electrostatic charges loses the charges at the portions to which light beams are directed, so that charges are held in the dark portions. An amount of toner is then dusted on the selenium plate and is adsorbed at the portion having charges, then printed on a paper sheet and baked thereon. The electrostatic attractive force at a certain point is determined not only by the charges at that point but by the integrated effect of all of the adjacent electrostatic fields. The positive and negative pattern in the respective field resembles closely the pattern of the exciting and inhibitory components in the field of a nerve unit of the retina, resulting in the same phenomenon. Namely, the contour line is emphasized and the uniform region will disappear.

3. In FIG. 3 letters A and B are shown in which the regions surrounded by the contour lines are smeared away, but the letters can easily be recognized.

4. FIG. 4 shows two regions 2 and 3 separated by the contour line 1. Although the regions 2 and 3 are equal in brightness, the inner region 2 will seem brighter than the outer region 3.

5. In the art of reflection, the transmission of a certain pattern is frequently performed by sending the information relating to the contour of the pattern and the pattern reconstructing by using information relating to the amplitude between the maximum and minimum values at the contour. Similarly, in situations where pattern cognition is by human beings, the feature common to the patterns appears objectively different and is abstracted and sent to the cerebrum where the maximum and minimum values in the brightness in the nervous reaction is set. Accordingly, the visual effect of the contour effects the broader region adjacent to the local portion, as well as the local portion itself. The information relating to the visible brightness is set in accordance with the maximum and minimum values, and, as a result, the brightness at the adjacent regions is determined by the set value.

FIG. 5 illustrates a prior art liquid crystal display device which comprises an upper glass substrate 51, a transparent segment electrode 52, a layer of liquid crystal substance 53, a transparent common electrode 54, a lower glass substrate 55 and a reflecting plate 56.

The liquid crystal display device is manufactured by the well known process of vapor depositing indium oxide or the like on the whole surfaces of the substrate 51 and 55 to form a transparent electroconductive layer. The unnecessary portion of the layer is etched away and the remaining segment and common electrodes are left having the requisite pattern. By placing the substrates to as to face the electrode 52 with the electrode 54 with the layer of liquid crystal substance 53 disposed therebetween the requisite structure is assembled. When an alternating voltage is impressed across the electrodes, the optical status of the liquid crystal substance is altered so as to change the light transmitting condition.

With electrochromism display devices, the liquid crystal substance forming the layer 53 in FIG. 5 is replaced by an inorganic electrochromism display element and an insulating layer is provided between the electrochromism display element layer and the transparent common electrode 54.

FIG. 6 illustrates a pattern formed by transparent electrodes which comprises seven segments. As shown in this figure, the electrodes used in the prior art light transmission display device is constructed of a number of electro-conductive sections uniformly distributed over the whole segment region. Accordingly, each segment gives an even brightness by the optical transmitting effect when an alternating voltage is impressed across the electrodes facing one another. As has been stated, the visual cognition in human beings is accomplished by a mechanism in which the information relating to the contour line is obtained under the edge effect and then transmitted to the cerebrum where the information on the central part of the pattern is abstracted even if the brightness of the central part is not equal. Therefore, it can be said that the brightness of the central part may be lower than that of the contour part, if the central part has a sufficiently uniform brightness to be abstractable, because the pattern can be congnized as one having an even brightness.

SUMMARY OF THE INVENTION

An object of this invention is to provide an improved light transmissive digital display device of the type afore-described which is capable of saving electric power and providing high visibility.

In the display device according to this invention the reduction in power consumption is performed by differentiating the brightness at the central part of a segment from the contour part. As clearly seen from the foregoing discussion, the difference between central and contour parts in brightness will not reduce cognitive ability.

IN THE DRAWINGS

FIG. 3 illustrates a pattern showing two letters;

FIG. 4 is a pattern showing a particular visual effect;

FIG. 5 is a cross section showing a part of the conventional liquid crystal display device;

FIG. 6 shows a pattern of a prior art display device as having uniform brightness;

DETAILED DESCRIPTION OF THE INVENTION

Figure 1:
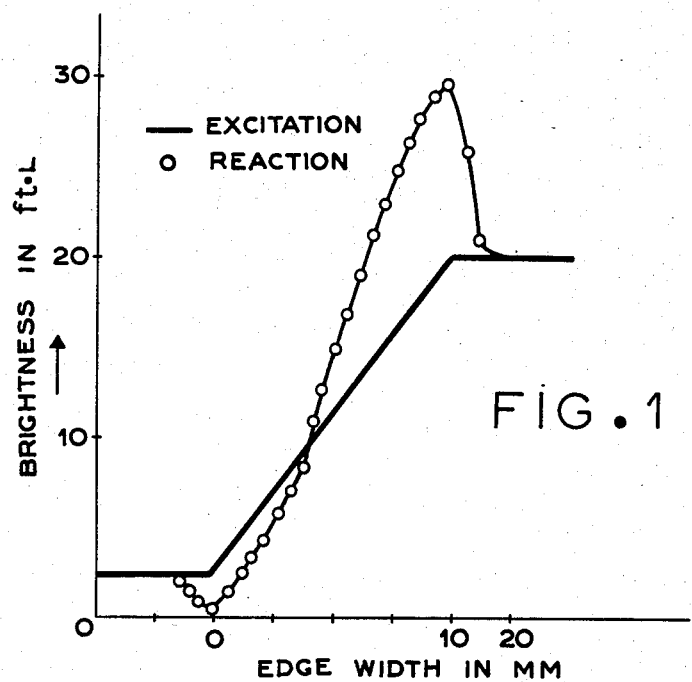
FIG. 1 is a graph showing the contour emphasising effect on the pattern cognition by the human body.
Figure 2A:
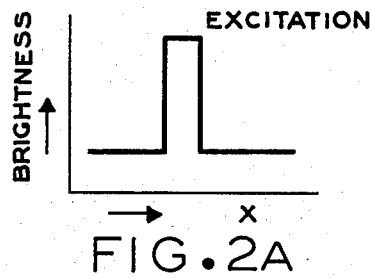
FIGS. 2A, 2B and 2C show steps that contour emphasising effect is occurred by the mutual inhibition of the nerve systems.
Figure 2C:
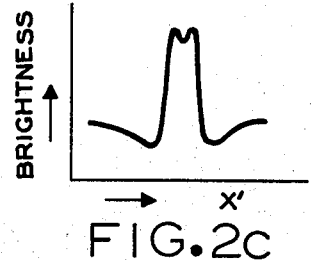
Figure 2B:
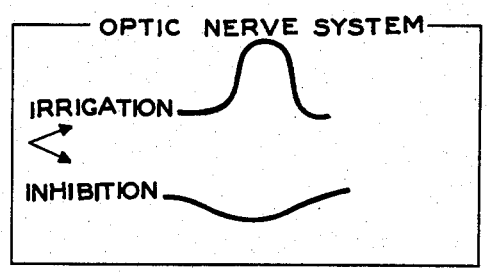
Figure 7A:
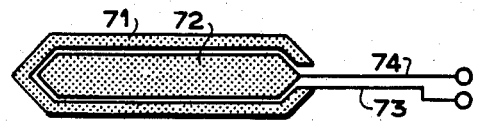
FIGS. 7A and 7B show electrode patterns of prior art display devices which are considered to save electric power.

FIG. 7A illustrates an electrode pattern of a liquid crystal digital display device which is considered to have a reduced power consumption, the segment electrode of which comprises an outer electrode 71 and an inner electrode 72. The outer electrode 71 is connected to a power source (not shown) having a higher voltage through a line 73, while the inner electrode 72 is connected to another power source (not shown) having a lower voltage via a line 74 to obtain a conspicuous contour line. This technique, however, has drawbacks as set forth below because there are double leads:

1. Complicated and difficult wiring operations are necessary.
2. The width of the leads and the space therebetween has to be made narrow, resulting in lead breakage and leaks between adjacent leads.
3. The increase in connecting points to the driving circuit results in error in manufacture or in use.
4. As the result of the above points the applicable number of the segments and the display pattern is restricted.
5. It is necessary to utilize two kind of power sources having different voltages. Furthermore, in case of liquid crystal display device, application of the different voltages is not a desirable approach because the impression of the higher voltage will not give a higher contrast. Furthermore it is necessary to impress a voltage higher than a certain threshold level in order to obtain a desired level of enerigization and, therefore, the decrease in power consumption owing to the impression of the lower voltage at the restricted part is not effective.

Figure 7B:
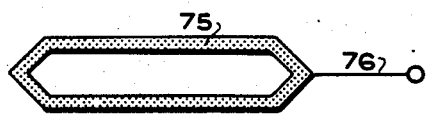
Figure 8:
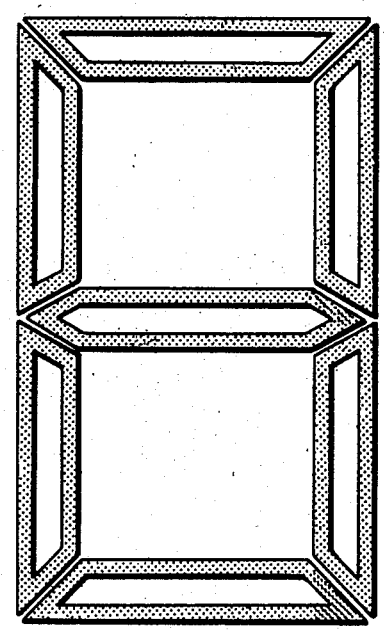
FIG. 8 illustrates a display pattern of the prior art display device having electrodes such as those shown in FIG. 7A or 7B.

FIG. 7B shows a prior art segment electrode comprising on outer electrode 75 and a single lead 76. In this situation, although the problem described above is not encountered, the pattern formed by using segments having electrode patterns shown in FIG. 7B is, as is shown in FIG. 8, quite different from that of FIG. 6.

This invention provides a useful and effective approach to an improved display device which is capable of indicating a display pattern substantially equal to the conventional one however having reduced power consumption.

Figure 9A:
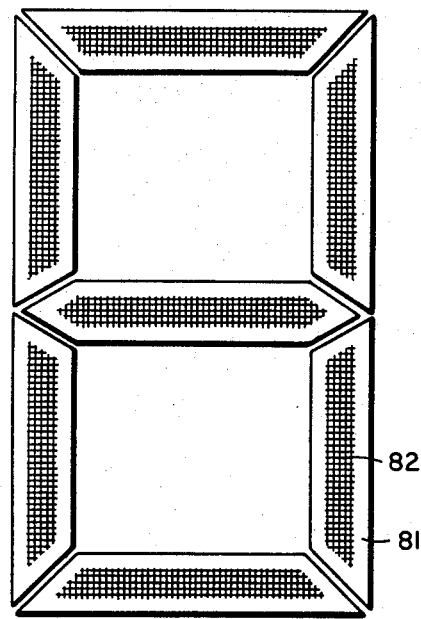
FIG. 9A is an electrode pattern of the display device according to this invention and FIG. 9B shows one of the electrodes of the display devvice of FIG. 9A.
Figure 9B:
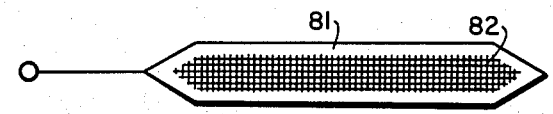

An arrangement of the segment electrodes of the device embodying this invention is shown in FIG. 9A and one of the segment electrodes in FIG. 9B. Of course, the construction of the display device is similar to that shown in FIG. 5 with the exception that the pattern of the respective segment electrodes is altered.

In FIG. 9B, the segment electrode 80 comprises a number of electro-conductive sections, the distribution density of which is higher at a contour part 81 and lower at a central part 82. Comparing this with the electrode pattern shown in FIG. 6, it can be said that the electrode pattern of FIG. 9B comprises a first electrode portion forming a contour part and a second electrode portion disposed in the central part of the first electrode and consisting of a number of electrode sections electrically connected to each other as well as to the first electrode portion.

Such segment electrode can easily be formed by depositing a transparent electro-conductive layer on the whole surface of a glass substrate and thereafter removing the unnecessary part of the layer to leave the desired conductive pattern by means of known etching techniques using a mask with a predetermined pattern.

The digital display device having the segment electrode shown in FIGS. 9A and 9B will indicate a predetermined display pattern when excited by impressing an alternating voltage across the segment electrode and a common electrode facing it. At the energized state, the light transmissive substance is locally energized at the portion facing the first electrode portion 81 and at the electrode sections and the connecting portion in accordance with the impressed voltage, so that the visual contrast to the deenergized portion will be higher at the first electrode portion 81 and lower at the second electrode portion 82.

When the width of the first electrode portion 81 and the distribution density of the conductive sections of the second electrode portion 82 is properly selected, through the visual cognition of the human mind, the reaction with the contour emphasising effect at the contour portion 81 having a high brightness is cognised under the influences exerting to the central portion 82, resulting in the appearance which is identical to the pattern given by the device having a uniform segment electrode.

With a Twist-type liquid crystal display element, the contour and central portions 81 and 82 are black when viewed together, although the former is black and the latter is dark gray when viewed alone.

The power consumption rate in the light transmissive display device porportionates to the area of the electrodes facing each other and, accordingly, the display device according to this invention has a reduced power consumption rate owing to the reduction of the total area of the segment electrode which has a lower distribution density at the central portion thereof.

If additional savings in power consumption is desired, regardless of the lowering in visual contrast, it is possible to use an electrode at the contour part with a much thinner width and to use electrode sections having a lower distribution density. In such cases, of course, the visual or apparent contrast can be increased in comparison with the absolute value to improve the cognition effectiveness.

When this invention is applied to an electrochromatic display device, another advantage in addition to the saving in power is obtained. In the electrochromatic display device, when the electrochromism element is energized by direct current voltage impressed across the electrodes facing each other, the necessary time from the start of the voltage impression to the fully energized state, i.e., the response speed is approximately in inverse proportion to the area of the electrodes and in direct proportion to the voltage impressed, when use is made of an energizing circuit with a high internal impedance, such as a Complementary Metal Oxide Semiconductor circuit. Therefore, the electrochromatic display device having one or more segment electrodes according to this invention, can have an increased response speed with a relatively low voltage owing to the decrease in the area of the electrodes.

Figure 10:
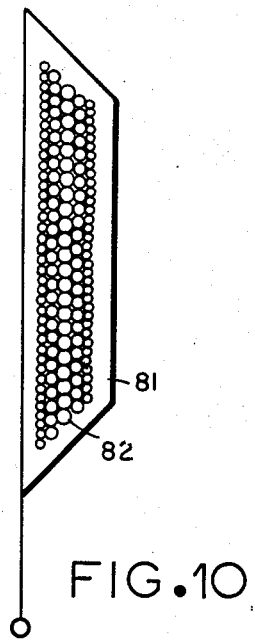
FIG. 10 shows another electrode pattern according to this invention.

In FIG. 10 there is shown a further segment electrode pattern embodying this invention, of which distribution density is gradually decreased toward the central part 82 from the contour part 81.

Figure 11:
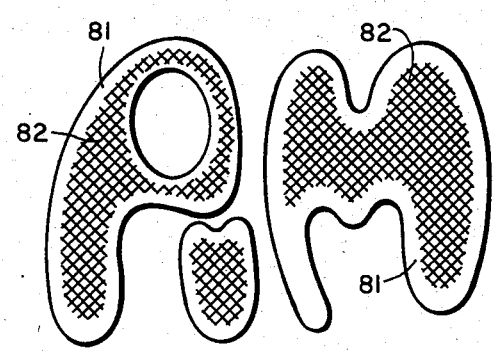
FIG. 11 shows a further electrode pattern according to this invention.

This invention is not limited in scope to that segment electrodes forming the display pattern as set forth above which have the specific distribution density of the electrode sections. For example, the electrode pattern according to the present invention can also be applied for indicating the forenoon and afternoon by using a display pattern such as that shown in FIG. 11, and other letters or figures.

Figure 12:
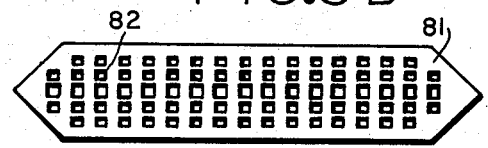
FIG. 12 shows a still further electrode pattern embodying this invention.

The electrode pattern of this invention can be formed by using the known etching technique described hereinbefore taking in connection with FIG. 9, or by overlaying a layer of insulating material having the predetermined pattern as shown in FIG. 12 on the transparent conductive layer as shown in FIG. 6, so that a number of electrode sections are electrically connected to each other.

The equivalent effect can be obtained by providing a common electrode having a number of electrode sections at the position facing the respective segment electrodes having a uniform conductivity.

This invention, as has been stated above, is useful especially in the display device for portable timepieces and table-type calculators in which saving of electric power is a very important factor.

What is claimed is:

1. In a display device of the light transmitting type, wherein the device includes at least one pattern having a periphery and central portion within the periphery;
   first and second substrates of insulating material having inner surfaces facing one another.
   a layer of light transmitting material disposed between the substrates;
   a plurality of segment electrodes deposited on the inner surface of the first substrate between the first substrate and the layer of light transmitting material wherein each segment electrode contains the pattern having a periphery and central portion;
   a common electrode deposited on the inner surface of the second substrate between the second substrate and the layer of light transmitting material; and
   a plurality of electro-conductive sections forming segment electrodes, wherein said sections adjacent the periphery have a higher distribution density than those forming the central portions, so that the periphery of the pattern is brighter than the central portion and the pattern has the same visual impact as a pattern with a constant distribution density.

2. A display device, as claimed in claim 1, wherein said light transmitting substance is an electrochromatic display element.

3. A display device, as claimed in claim 1, wherein said light transmitting substance is liquid crystal material.

4. A display device as claimed in claim 1, wherein the distribution density gradually decreases toward said central part from said contour part.

* * * * *